(12) United States Patent
Meiser

(10) Patent No.: US 10,238,211 B2
(45) Date of Patent: Mar. 26, 2019

(54) GRATE, IN PARTICULAR FOR USE AS A SHELF FOR PALLET RACKS OR HEAVY DUTY RACKS

(71) Applicant: Gebrueder Meiser GmbH, Schmetz (DE)

(72) Inventor: Wolfgang Meiser, Saarbrucken (DE)

(73) Assignee: Gebrueder Meiser GmbH, Schmelz (DE)

( * ) Notice: Subject to any disclaimer, the term of this patent is extended or adjusted under 35 U.S.C. 154(b) by 0 days.

(21) Appl. No.: 15/578,824

(22) PCT Filed: Jun. 13, 2016

(86) PCT No.: PCT/DE2016/100268
§ 371 (c)(1),
(2) Date: Dec. 1, 2017

(87) PCT Pub. No.: WO2016/198050
PCT Pub. Date: Dec. 15, 2016

(65) Prior Publication Data
US 2018/0160811 A1    Jun. 14, 2018

(30) Foreign Application Priority Data

Jun. 11, 2015 (DE) .................. 10 2015 109 306
Jan. 11, 2016 (DE) .................. 20 2016 100 077 U

(51) Int. Cl.
*A47B 96/02* (2006.01)
*B65G 1/02* (2006.01)
(Continued)

(52) U.S. Cl.
CPC .............. *A47B 96/021* (2013.01); *B65G 1/02* (2013.01); *E04C 2/421* (2013.01); *E04C 3/04* (2013.01); *F16B 7/044* (2013.01)

(58) Field of Classification Search
CPC ......... A47B 96/021; E04C 3/04; E04C 2/421; B65G 1/02; F16B 7/044
See application file for complete search history.

(56) References Cited

U.S. PATENT DOCUMENTS 3,142,386 A * 7/1964 Skubic ................. A47B 57/402
211/182
3,349,924 A * 10/1967 Maurer ................. A47F 7/0014
211/189

(Continued)

FOREIGN PATENT DOCUMENTS

DE    80 14 894 U1    12/1987
DE    88 08 144 U1    8/1988
(Continued)

OTHER PUBLICATIONS

Letter from the European Patent Attorney to the European Patent Office dated Mar. 29, 2017 regarding PCT/DE2016/100268, with an English translation of relevant parts.
(Continued)

*Primary Examiner* — Ko H Chan
(74) *Attorney, Agent, or Firm* — Collard & Roe, P.C.

(57) ABSTRACT

A grating for use as shelves for pallet racks or heavy-duty racks, having two longitudinal sides and cross members fitted between the longitudinal sides. The, longitudinal sides are in the shape of a profile in cross section. The profile includes at least a first leg and a second leg arranged substantially orthogonal to the first leg. At least two of the cross members have an open profile, in particular a U- or L-shaped profile in cross section, the open end of which is oriented towards the underside of the grating. Each of these cross members has at least two punched recesses at each end. The first leg of the profile is arranged in each punched recess and is firmly connected thereto via a form- or force- (Continued)

fitting connection method. The first leg of the profile has at least one deformation.

14 Claims, 7 Drawing Sheets

(51) Int. Cl.
*E04C 2/42* (2006.01)
*E04C 3/04* (2006.01)
*F16B 7/04* (2006.01)

(56) References Cited

U.S. PATENT DOCUMENTS

| | | | | |
|---|---|---|---|---|
| 4,078,664 A * | 3/1978 | McConnell | ............ | A47B 96/00 |
| | | | | 108/159 |
| 6,105,798 A * | 8/2000 | Gruber | ............ | B65G 1/023 |
| | | | | 211/151 |
| 6,425,558 B1 * | 7/2002 | Saunders | ............ | B65D 88/129 |
| | | | | 108/143 |
| 8,439,207 B2 * | 5/2013 | Currin | ............ | A47F 5/0838 |
| | | | | 211/106.01 |
| 9,290,322 B2 * | 3/2016 | Heijmink | ............ | A47B 47/0058 |
| 2003/0136954 A1 * | 7/2003 | Platt | ............ | E04F 11/1834 |
| | | | | 256/65.1 |
| 2004/0251225 A1 * | 12/2004 | Cross | ............ | A47B 96/021 |
| | | | | 211/153 |
| 2015/0076098 A1 * | 3/2015 | Caldwell | ............ | A47B 96/021 |
| | | | | 211/183 |

FOREIGN PATENT DOCUMENTS

| | | |
|---|---|---|
| DE | 20 2007 013691 U1 | 12/2007 |
| DE | 20 2009 013922 U1 | 2/2010 |
| EP | 0 576 693 A1 | 1/1994 |
| EP | 1 559 346 A1 | 8/2005 |
| EP | 2 062 502 A1 | 5/2009 |

OTHER PUBLICATIONS

International Search Report of PCT/DE2016/100268, dated Sep. 12, 2016.

* cited by examiner

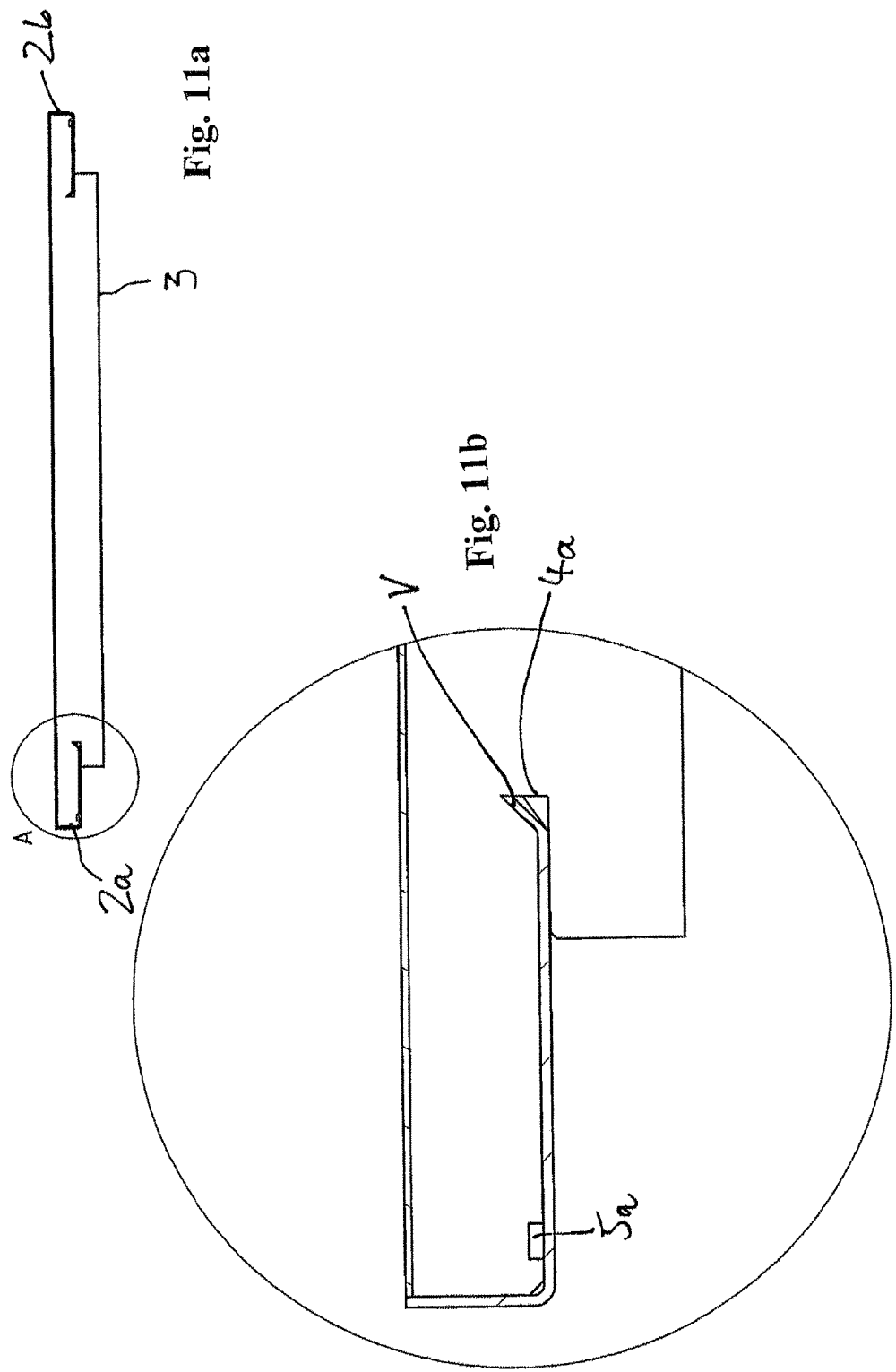

GRATE, IN PARTICULAR FOR USE AS A SHELF FOR PALLET RACKS OR HEAVY DUTY RACKS

CROSS REFERENCE TO RELATED APPLICATIONS

This application is the National Stage of PCT/DE2016/100268 filed on Jun. 13, 2016, which claims priority under 35 U.S.C. § 119 of German Application Nos. 10 2015 109 306.5 filed on Jun. 11, 2015 and 20 2016 100 077.7 filed on Jan. 11, 2016, the disclosures of which is incorporated by reference. The international application under PCT article 21(2) was not published in English.

The present invention relates to gratings, in particular for use as shelves for pallet racks or heavy-duty racks, having two longitudinal sides and cross members fitted between the longitudinal sides.

In view of possible fire hazards in warehouses, goods are stored on gratings mounted in pallet racks or heavy-duty racks. As disclosed in DE 80 14 894 U1, for example, the longitudinal sides of these gratings have profiles enabling them to be mounted on the supporting beams or bars of the racks. Longitudinal and cross bars, on which the goods are stored, are fitted between the longitudinal sides of the gratings. On account of the way in which the gratings are designed, with longitudinal and cross bars, empty spaces are formed in the gratings through which, in the event of a fire, extinguishing agents (e.g. water) from sprinkler systems, which are often installed above the gratings, are able to pass. The longitudinal and cross bars of the gratings are engineered in such a way as to confer the highest possible load-carrying capacity on the gratings and still guarantee sufficient open spaces for water to pass through. The longitudinal sides as well as the longitudinal and cross bars of known gratings are accordingly made of steel and, in order to ensure the desired stability and load-carrying capacity, are not hollow.

The gratings described above have the disadvantage that, to ensure a high load-carrying capacity, they themselves have a high dead weight. Accordingly, pallet and heavy-duty racks have to be designed in such a way as to enable them to carry not only the goods but also the gratings. These highly stressed pallet and heavy-duty racks are relatively expensive to purchase. A further disadvantage is the high material cost of providing the desired load-carrying capacity.

EP 1 559 346 A1 and DE 88 08 144 U1 therefore disclose rack gratings having two longitudinal sides with cross members fitted therebetween, wherein the longitudinal sides have a cross-section in the shape of an open U profile.

The open sides of the cross members are oriented towards the underside of the grating. Each of these cross members has recesses at each end, which can be releasably coupled with the longitudinal sides via support elements.

Gebr. Meiser GmbH, furthermore, offers U-profile rack gratings having two longitudinal sides with cross members fitted therebetween, wherein the longitudinal sides have a cross section in the shape of a profile comprising at least a first leg and a second leg, which is substantially orthogonal to said first leg, wherein at least two of the cross members have a cross section in the shape of an open profile, the open side of said profile being oriented towards the underside of the grating, wherein each of these cross members has at least one punched recess at each end, in each of which the first leg of the profile is arranged and firmly connected to by means of a substance-to-substance joining technique, in particular a resistance welding technique.

During joining, however, the welding process used requires continuous monitoring and regulation of the welding parameters because each change in the nature of the starting materials is reflected as a disturbance variable in the process and in the quality of the finished product. Monitoring and regulation of the welding parameters during joining are particularly necessary if very thin materials, materials of different thicknesses or pre-coated materials have to be joined together via a substance-to-substance technique. If the welding parameters are not monitored and regulated continuously during joining, the durability of the weld in service might be impaired, possibly leading to failure of the weld and thus to destabilization of the rack grating.

The aim of the invention is thus to provide a grating which is lighter in weight and which, requiring less monitoring, is less expensive to produce than prior-art gratings, without impairing the structural stability or the load-carrying capacity.

The aim of the invention is achieved, firstly, by way of a grating, in particular for use as shelves for pallet racks or heavy-duty racks, having two longitudinal sides and cross members fitted between the longitudinal sides, wherein the longitudinal sides have a cross section in the shape of a profile comprising at least a first leg and a second leg, which is substantially orthogonal to said first leg, wherein at least two of the cross members have a cross section in the shape of an open profile, in particular a U- or V-shaped profile, the open end of which is oriented towards the underside of the grating, wherein each of these cross members has at least two punched recesses at each end, in each of which the first leg of the profile is arranged and firmly connected to by means of a connection method, characterized in that the first leg of the profile is inserted or pressed into each of the punched recesses, thereby vertical fixation of the profile with the cross member is achieved, and that the first leg of the profile has at least one deformation, wherein the at least one deformation is an impression, thereby horizontal fixation of the plug-in or press-fit connection of the cross member with the profile is achieved.

The aim of the invention is also achieved by way of a grating, in particular for use as shelves for pallet racks or heavy-duty racks, having two longitudinal sides and cross members fitted between the longitudinal sides, wherein the longitudinal sides have a cross section in the shape of a profile comprising at least a first leg and a second leg, which is substantially orthogonal to said first leg, wherein at least two of the cross members have a cross section in the shape of an L profile, at least one of the open sides being oriented towards the underside of the grating, wherein each of these cross members has a punched recess at each end, in which the first leg of the profile is arranged and firmly connected to by means of a connection method, characterized in that the first leg of the profile is inserted or pressed into the punched recess, thereby vertical fixation of the profile with the cross member is achieved, and that the first leg of the profile has at least one deformation, wherein the at least one deformation (V1, V2) is an impression, thereby horizontal fixation of the plug-in or press connection of the cross member with the profile is achieved.

With both solutions, the open configuration of at least two cross members leads to a reduction in the weight of the grating, since these cross members, which have a cross section in the shape of an open profile—in particular a U-, L- or V-shaped profile—have a high moment of resistance.

As several of these gratings are arranged as shelves in pallet racks or heavy-duty racks, a reduction in the weight of the gratings leads to a reduction in the cost of the racks themselves, as these have to carry less weight for the same level of stability. As a result, the material costs (for attaining this level of stability) for the racks can be reduced.

On account of the leg of the profile having been pushed or pressed into the punched recess in the cross member, vertical displacement of the profile relative to the cross member is prevented. Both solutions provide for horizontal fixation, i.e. preventing the components (profile and cross member) from shifting relative to one another, by means of a further connection method, namely a form- or force-fitting connection method. Horizontal fixation may ensue either before or after the components are joined together.

In order to prevent the components (profile and cross member) from shifting relative to one another, provision is made for the first leg of the profile to have at least one deformation. In this context, it may be to advantage if the at least one deformation is created after the profile and the cross members have been connected.

The at least one deformation is preferably near or directly beside the plug-in or press-connection of the cross member with the profile. Advantageously, the invention also provides for the profile to have at least two deformations, one on each side of, either near or directly beside, the plug-in- or press-fit connection, so that the push- or press-fit connection between the cross member and the profile is fixed horizontally on both sides.

In the case of both solutions, provision is made for the at least one deformation to be an impression. In this invention, an impression is a deformation created in the leg by way of pressure, deep drawing or with a stamping tool.

It is within the scope of the invention for the profile to be configured as a Z profile or as an L profile, the Z profile comprising a second leg, which is substantially parallel to the first leg, and a connecting part that connects the first and second legs, and the L profile comprising a first leg and a second leg, which is substantially orthogonal to the first leg. The longitudinal sides of the grating, which are configured as L or Z profiles, are arranged in the recesses made at the ends of the cross member and are firmly connected therewith by means of a connecting method, in particular a form-fitting and/or a force-fitting connection method.

As another measure to prevent the components (profile and U- or V-shaped cross member) from shifting relative to one another, the invention furthermore provides for the first leg of the profile to have at least one additional deformation, to be created prior to connection with the cross members.

This enables the cross member to be pushed over the at least one already-existent additional deformation, which will thereafter secure the cross member against displacement.

For all the aforementioned deformations, provision is advantageously made for the additional deformation to be an impression. In this invention, an impression is a deformation created in the leg by way of pressure, deep drawing or with a stamping tool.

It is advantageous that the first leg of the profile has at least one tongue, which is oriented towards the cross member, in the area bordering on the second leg.

A second support point is created in this way in the contact area between the profile and the cross member. This support point is able to statically absorb torque originating in the plane of the connecting leg and is advantageous, particularly in the case of long cross members, in view of the torque acting on the grating. This second support point is advantageously located as far away as possible from the first support point, which is formed by the deformation near, or directly beside, the plug-in- or press-fit connection between the cross member and the profile. On account of their being in direct contact with the inner side of the cross members, the tongue(s) is/are able to take up the torque and increase the overall stability of the grating.

It is preferable in this connection if at least two tongues are provided, which are oriented towards the cross members.

From a manufacturing aspect, it makes sense for the tongues and the cross member's punched recesses to be oriented in the same direction. If the recesses punched out of the cross members are oriented upwards with respect to the grating's post-assembly position, a downwardly operating stamping and punching tool can generate all the material deformations simultaneously, since all the elements to be joined in the joining process can be turned by 180° relative to the grating's post-assembly position.

On the upper side of the grating, the cross members, which have U-, L- or V-shaped cross sections and have their open side oriented towards the underside of the grating (L-shaped cross members preferably have the shorter of the open sides oriented towards the underside of the grating), form so-called "slides", over which goods arranged on pallets or in cartons can easily be moved. Due to the high load-carrying capacity of the U-, L- or V-shaped profiles of the cross members and of the lack of necessity to use bearing bars or cross bars, the grating is able to carry heavy loads and has a low dead weight.

According to an embodiment of the invention, therefore, all cross members have a cross section in the form of an open profile, with the open side oriented towards the underside of the grating.

It is within the scope of the invention for the grating to consist of steel, stainless steel or aluminium.

Provision may be made advantageously for the grating to consist of steel that has been pre-galvanized.

A further embodiment of the invention advantageously provides for the surfaces of the longitudinal sides and the cross members to be coated with a coating material that protects the surfaces from corrosion and/or acts as a fire-repellent.

It is within the scope of the invention for the ratio of the grating's load-carrying capacity to the grating's dead weight to be in the range from 10 to 200.

This means that the grating according to the invention has a load-carrying capacity which is 10 to 200 times greater than its dead weight.

Tables 1 and 2 are load tables for a grating according to the invention. The grating has cross members with a cross section in the shape of an open U-shaped profile, the open end of which is oriented towards the underside of the grating. Table 1 is a load table for a grating width of 890 mm; Table 2 is a load table for a grating width of 1340 mm.

TABLE 1

| Grating length | 300 kg/m² | | 500 kg/m² | | 800 kg/m² | | 1000 kg/m² | |
|---|---|---|---|---|---|---|---|---|
| | U profile | Pitch | U profile | Pitch | U profile | Pitch | U profile | Pitch |
| 944 mm | 20 × 29 × 0.7 | 124 mm | 20 × 31 × 0.8 | 124 mm | 20 × 37 × 0.8 | 124 mm | 20 × 37 × 1.0 | 124 mm |
| 995 mm | 20 × 29 × 0.7 | 124 mm | 20 × 33 × 0.8 | 124 mm | 20 × 39 × 0.8 | 124 mm | 20 × 40 × 1.0 | 124 mm |
| 1,200 mm | 20 × 33 × 0.8 | 124 mm | 20 × 37 × 1.0 | 124 mm | 20 × 39 × 1.0 | 87 mm | 20 × 40 × 1.0 | 79 mm |

TABLE 2

| Grating length | 300 kg/m² | | 500 kg/m² | | 800 kg/m² | | 1000 kg/m² | |
|---|---|---|---|---|---|---|---|---|
| | U profile | Pitch | U profile | Pitch | U profile | Pitch | U profile | Pitch |
| 944 mm | 20 × 29 × 0.7 | 120 mm | 20 × 31 × 0.8 | 120 mm | 20 × 37 × 0.8 | 120 mm | 20 × 37 × 1.0 | 120 mm |
| 995 mm | 20 × 29 × 0.7 | 120 mm | 20 × 33 × 0.8 | 120 mm | 20 × 39 × 0.8 | 120 mm | 20 × 40 × 1.0 | 120 mm |
| 1,200 mm | 20 × 33 × 0.8 | 120 mm | 20 × 37 × 1.0 | 120 mm | 20 × 39 × 1.0 | 88 mm | 20 × 40 × 1.0 | 77 mm |

A maximum permissible deformation (bending) of L/200 (grating length [min] divided by 200) was assumed for both load tables. As shown in Table 3, the ratio of the grating's load-carrying capacity to its dead weight is in the range from 10 to 200 (the grating's load-carrying capacity exceeds its dead weight by a factor of 10 to 200). The factor's unit is [(kg/m²)/(kg/grating)], where (kg/m²) describes a distributed payload. The factor for the following grating dimensions and a load of 1000 kg, for example, is:

TABLE 3

| Grating length [mm] × grating width [mm] | Factor [(kg/m²)/(kg/grating)] |
|---|---|
| 944 mm × 890 mm | 156 |
| 944 mm × 1340 mm | 98 |
| 995 mm × 890 mm | 144 |
| 995 mm × 1340 mm | 108 |

Tables 4 and 5 are likewise load tables for a grating according to the invention. Here, the grating has cross members with a cross section in the shape of an open L-shaped profile, the shorter, open side of which is oriented towards the underside of the grating. Table 4 is a load table for a grating width of 890 mm; Table 5 is a load table for a grating width of 1340 mm. A maximum permissible deformation of L/200 (grating length [mm]/200) was assumed for both tables.

TABLE 4

| Grating length | 300 kg/m² | | 500 kg/m² | | 800 kg/m² | | 1000 kg/m² | |
|---|---|---|---|---|---|---|---|---|
| | L profile | Pitch | L profile | Pitch | L profile | Pitch | L profile | Pitch |
| 944 mm | 20 × 27 × 0.8 | 87 mm | 20 × 33 × 0.8 | 87 mm | 20 × 36 × 1.0 | 87 mm | 20 × 40 × 1.0 | 87 mm |
| 995 mm | 20 × 29 × 0.8 | 87 mm | 20 × 35 × 0.8 | 87 mm | 20 × 39 × 1.0 | 87 mm | 20 × 42 × 1.0 | 87 mm |
| 1,200 mm | 20 × 33 × 0.8 | 87 mm | 20 × 37 × 0.8 | 58 mm | 20 × 40 × 1.0 | 58 mm | 20 × 44 × 1.0 | 58 mm |

TABLE 5

| Grating length | 300 kg/m² | | 500 kg/m² | | 800 kg/m² | | 1000 kg/m² | |
|---|---|---|---|---|---|---|---|---|
| | L profile | Pitch | L profile | Pitch | L profile | Pitch | L profile | Pitch |
| 944 mm | 20 × 27 × 0.8 | 88 mm | 20 × 33 × 0.8 | 88 mm | 20 × 36 × 1.0 | 88 mm | 20 × 39 × 1.0 | 88 mm |
| 995 mm | 20 × 29 × 0.8 | 88 mm | 20 × 35 × 0.8 | 88 mm | 20 × 39 × 1.0 | 88 mm | 20 × 36 × 1.0 | 60 mm |
| 1,200 mm | 20 × 36 × 0.8 | 88 mm | 20 × 40 × 1.0 | 88 mm | 20 × 40 × 1.0 | 60 mm | 20 × 44 × 1.0 | 60 mm |

The gratings with cross members having a cross section in the shape of an open, L-shaped profile also had a ratio of load-carrying capacity to dead weight in the range from 10 to 200, (the grating's load-carrying capacity is 10 to 200 times its dead weight).

The term "pitch" in Tables 1 and 2 and Tables 3 and 4 defines the distance from the center of a cross member to the center of an adjacent cross member.

The invention furthermore advantageously provides for at least 70% of the surface area covered by the grating to be configured as free projection area.

This configuration is particularly advantageous in order that, in the event of fire, the shading effect of the grating (which consists of cross members and longitudinal sides) is as little as possible, allowing extinguishing media from sprinkler systems to pass through the free projection area (open spaces) in the grating.

An advantageous embodiment of the invention provides for the at least one punched recess at each end of the cross member to have an entry contour with at least one chicane, thereby enabling centered insertion and force- or form-fitting connection of the first leg of the profile with the cross member.

In this embodiment of the invention, it is advantageous that the at least one punched recess at each end of the cross member is configured in the form of a wedge.

It is also within the scope of the invention for the first leg of the profile to have a bead and/or a chicane.

This embodiment makes it possible, furthermore, to join the first leg of the profile to the cross member by means of a force-fitting connection. It is also conceivable for the bead and/or chicane of the first leg of the profile to match the entry contour of the punched recess in the cross member, thereby enabling an additional force- or form-fitting connection between the first leg of the profile and the cross member.

The invention furthermore provides for the Z-profile's connecting part, which connects the first and second legs of the Z profile, or for the second leg of the L-profile, which is substantially orthogonal to the first leg, to have a bead.

This bead is provided on the connecting part of the Z profile, which connects the first and second legs thereof, or on the second leg of the L profile, which is substantially orthogonal to the first leg, in order to provide material for the welding process, this preferably being a resistance welding process, and thereby to provide a defined fusion line (incipient fusion points) along the profile for the join.

Illustrative embodiments of the invention, which is not limited to these, are explained below in more detail by reference to drawings. The drawing in FIG. 1 shows the grating of the invention as seen from above, where the longitudinal sides have a cross section in the shape of a Z profile;

FIG. 11a and FIG. 11b show a side view and a detailed view, respectively, of a further illustrative embodiment of a grating according to the invention;

Figure 1:
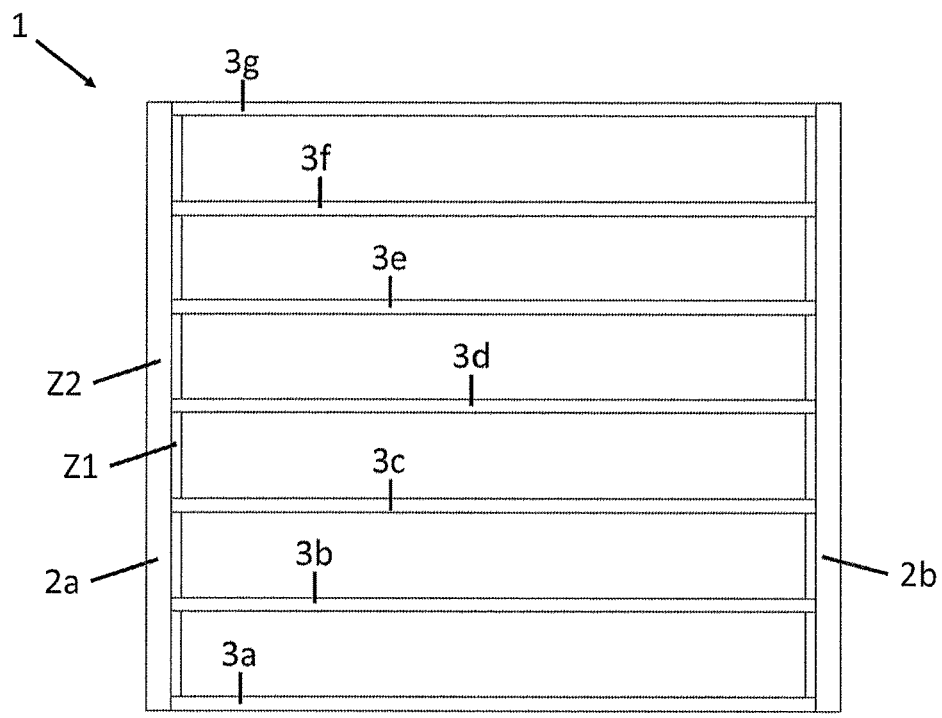

FIG. 1 shows the grating (1) of the invention as seen from above, with its two longitudinal sides (2a, 2b) and, fitted between the longitudinal sides (2a, 2b), cross members (3a-3g). The longitudinal sides (2a, 2b) have a cross section in the shape of a Z profile, the Z profile comprising a first leg (Z1), a second leg (Z2), which is substantially parallel to said first leg, and a connecting part that connects the first and second legs. The cross members (3a-3g) have a cross section in the shape of an open—here U- or L-shaped—profile, whose at least one open side is oriented towards the underside of the grating (1).

Figure 2:
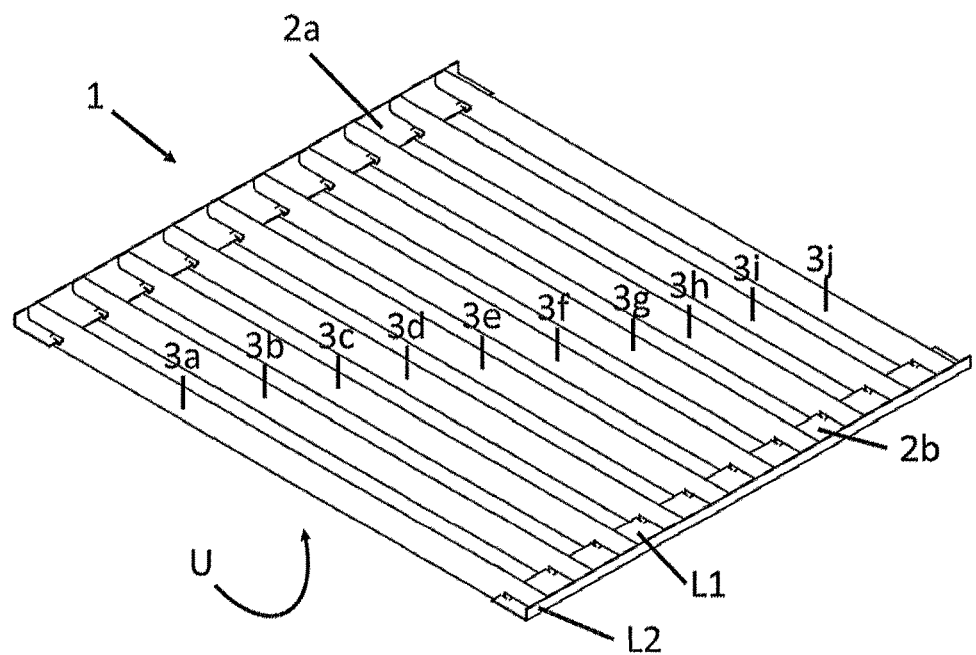
FIG. 2 shows a perspective view of the grating of the invention, where the longitudinal sides have a cross section in the shape of an L profile.

FIG. 2 shows a perspective view of the grating (1) of the invention, with its two longitudinal sides (2a, 2b) and, fitted between the longitudinal sides (2a, 2b), cross members (3a-3j). The longitudinal sides (2a, 2b) have a cross section in the shape of an L profile, the L profile comprising a first leg (L1) and a second leg (L2), which is substantially orthogonal to the first leg (L1). The cross members (3a-3j) have a cross section in the shape of an open—here U-shaped—profile, the open end of which is oriented towards the underside (U) of the grating (1).

Figure 3:
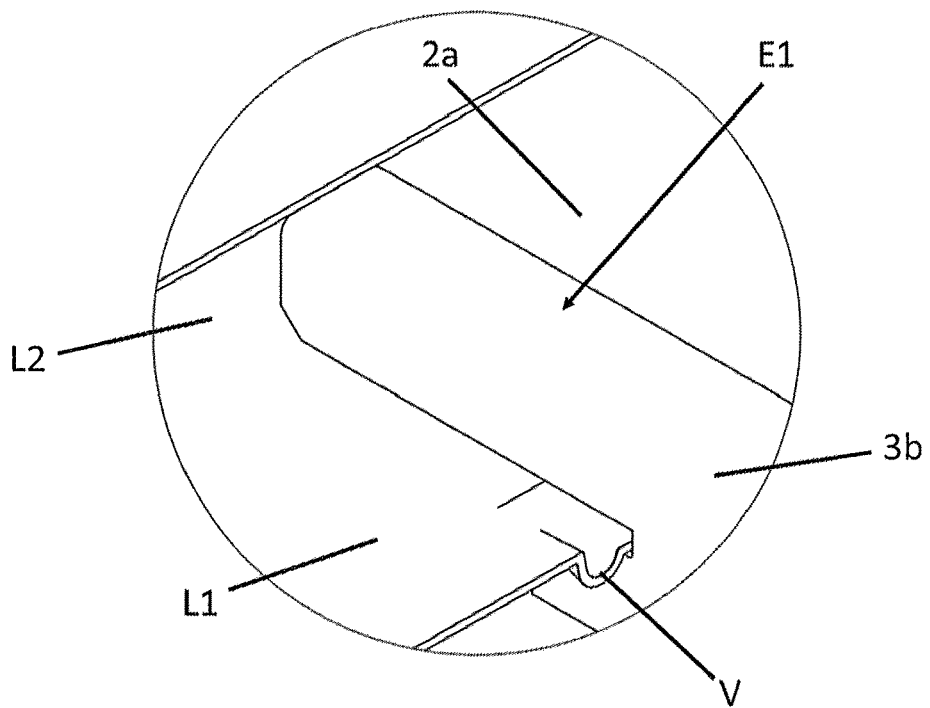
FIG. 3 shows an enlarged detail of the perspective view of FIG. 2, where an L profile has been arranged in the punched recesses of a cross member.

FIG. 3 shows an enlarged perspective view of the connection between a cross member (3b) and a longitudinal side (2a), the cross-section of which has the shape of an L profile. As shown, the first leg (L1) of the L profile has been pushed or pressed into the punched recesses at one end (E1) of the cross member. Since the cross member (3b) has a U-shaped cross section, with the open end of the U facing downwards, the cross member has two punched recesses at each end. The punched recesses preferably have a chicane and/or are of wedge-shaped configuration. Vertical fixation of the components (cross member and longitudinal side) relative to one another is achieved by pushing or pressing the first leg (L1) of the L profile into the punched recesses of the cross member (3b). The subsequent creation of deformations (V) in the first leg (L1) of the profile, for example to the right and to the left of the cross member, prevents any horizontal shifting of the components relative to one another. This subsequent deformation of the first leg (L1) also wedges it vertically within the punched recess, preventing the first leg (L1) from being pulled out of the punched recesses in the cross member.

Figure 4:
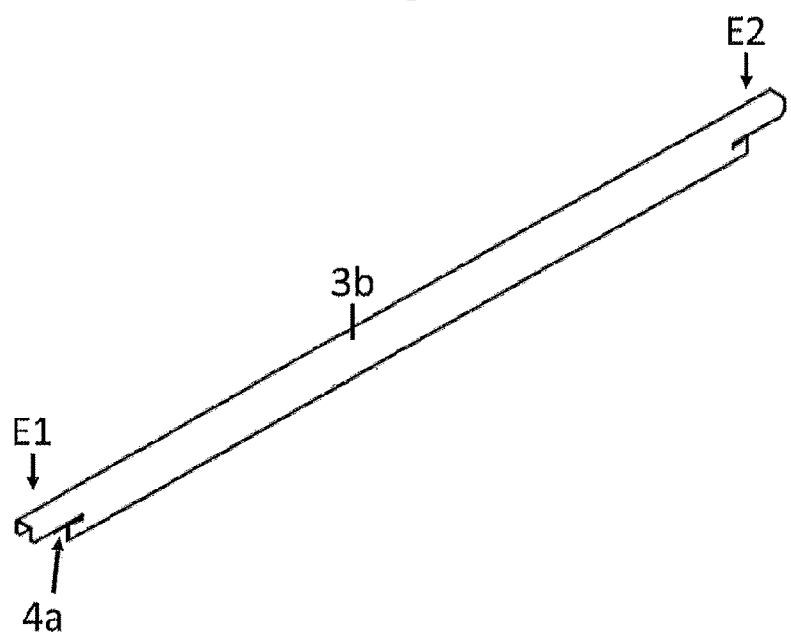
FIG. 4 shows a perspective view of a U-shaped cross member of the grating according to the invention, with punched recesses at each end.

FIG. 4 shows a perspective view of a cross member with a U-shaped cross section, which has at least two punched recesses at each end (E1, E2). Provision is made for at least one (4a) of the punched recesses at each end (E1, E2) to be of wedge-shaped configuration.

Figure 5:
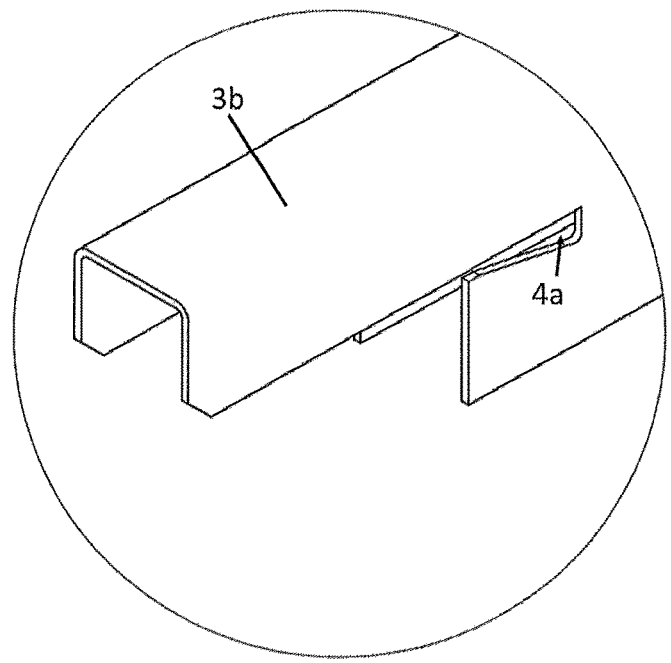
FIG. 5 shows a perspective view of an enlarged detail of the U-shaped cross member of FIG. 4, with a wedge-shaped punched recess at the enlarged end.
Figure 6:
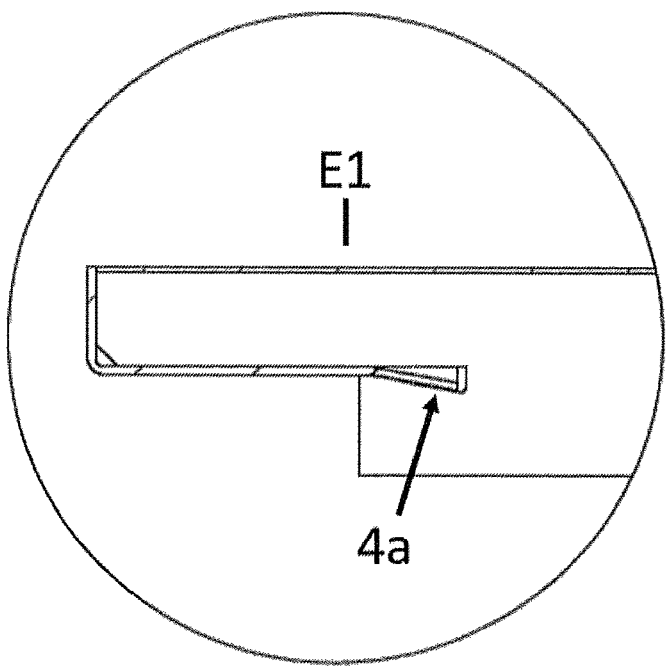
FIG. 6 shows a side view of an enlarged detail of the U-shaped cross member of FIG. 4, with a wedge-shaped punched recess at the enlarged end.
Figure 7:
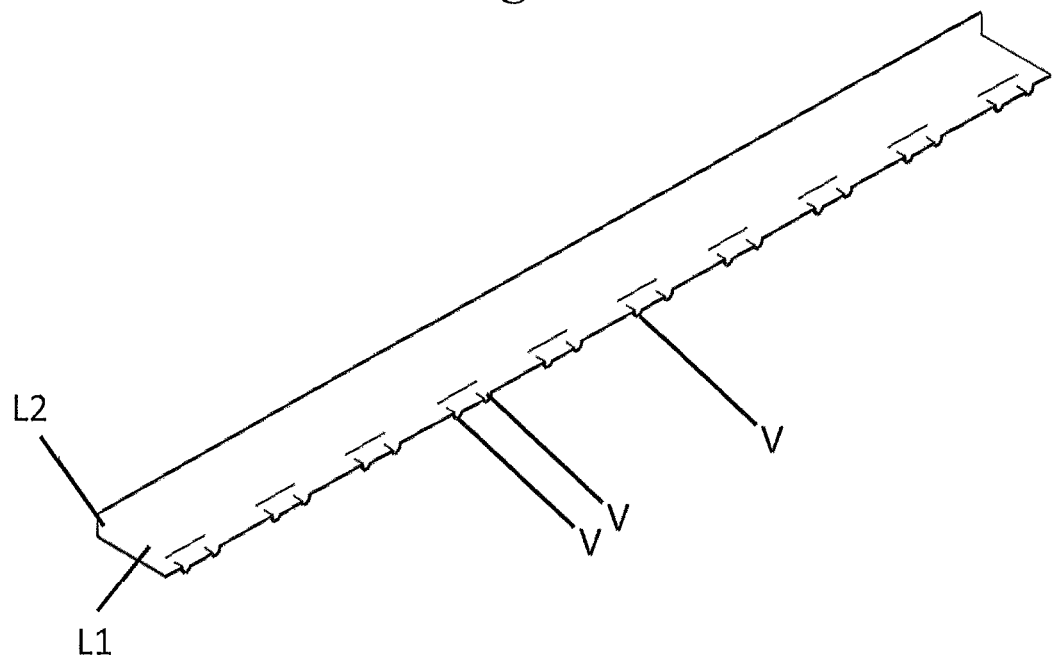
FIG. 7 shows a perspective view of a longitudinal side of the grating according to the invention, where the longitudinal side has a cross section in the shape of an L profile and has deformations.

FIG. 5 shows a perspective view of an enlarged detail of the U-shaped cross member of FIG. 4, with a wedge-shaped punched recess (4a) at the enlarged end (E1);

FIG. 6 shows a side view of an enlarged detail of the U-shaped cross member of FIG. 4, with a wedge-shaped punched recess (4a) at the enlarged end (E1);

FIG. 7 shows a perspective view of a longitudinal side, which is configured as an L profile (L1, L2) and has deformations (V). The deformations (V) may be introduced into the longitudinal side either before or after connection with the cross member.

Figure 8:
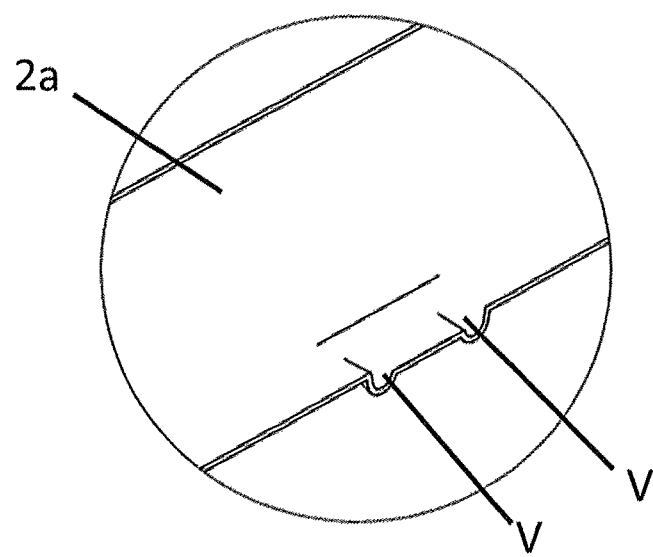
FIG. 8 shows a perspective view of an enlarged detail of the longitudinal side of FIG. 7, where the longitudinal side has a cross section in the shape of an L profile and has deformations.

FIG. 8 shows a perspective view of an enlarged detail of the longitudinal side (2a) of FIG. 7, which is configured as an L profile and has deformations (V).

Figure 9:
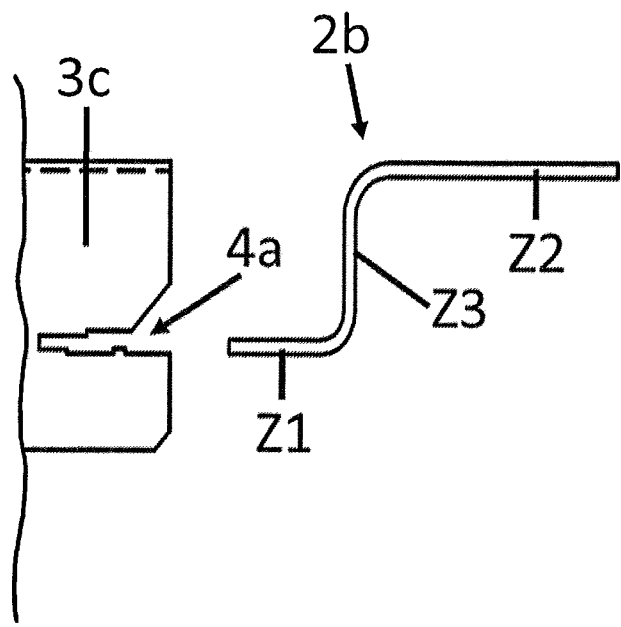
FIG. 9 shows a detail of the grating according to the invention, where a Z profile is illustrated that has not yet been mounted in the punched recess of a cross member.

FIG. 9 shows an exploded 2-D view of a connection in the grating. As shown, the longitudinal sides (2b) have a cross section in the shape of a Z profile (Z1-Z3), the Z profile (Z1-Z3) comprising a first leg (Z1), a second leg (Z2), which is substantially parallel to said first leg (Z1), and a connecting part (Z3) that connects the first and second legs. At the end of the cross member (3c) a punched recess (4a) is shown, into which the first leg (Z1) of the Z profile (Z1-Z3) is arranged. As shown, the punched recess has an entry contour with at least one chicane, thereby enabling centred insertion and force- and/or form-fitting connection of the first leg (Z1) of the Z profile (Z1-Z3) with the cross member.

Figure 10:
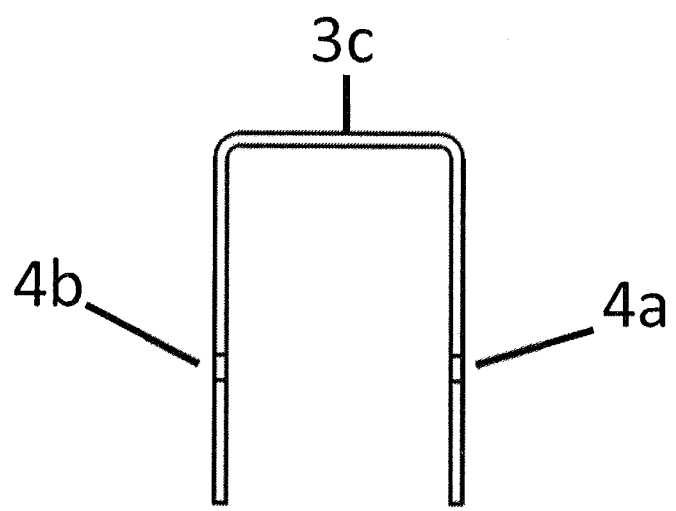
FIG. 10 shows a cross-sectional view of the cross member, where the cross member has a cross section in the shape of a U profile with two punched recesses.
Figures 12A, 12B:
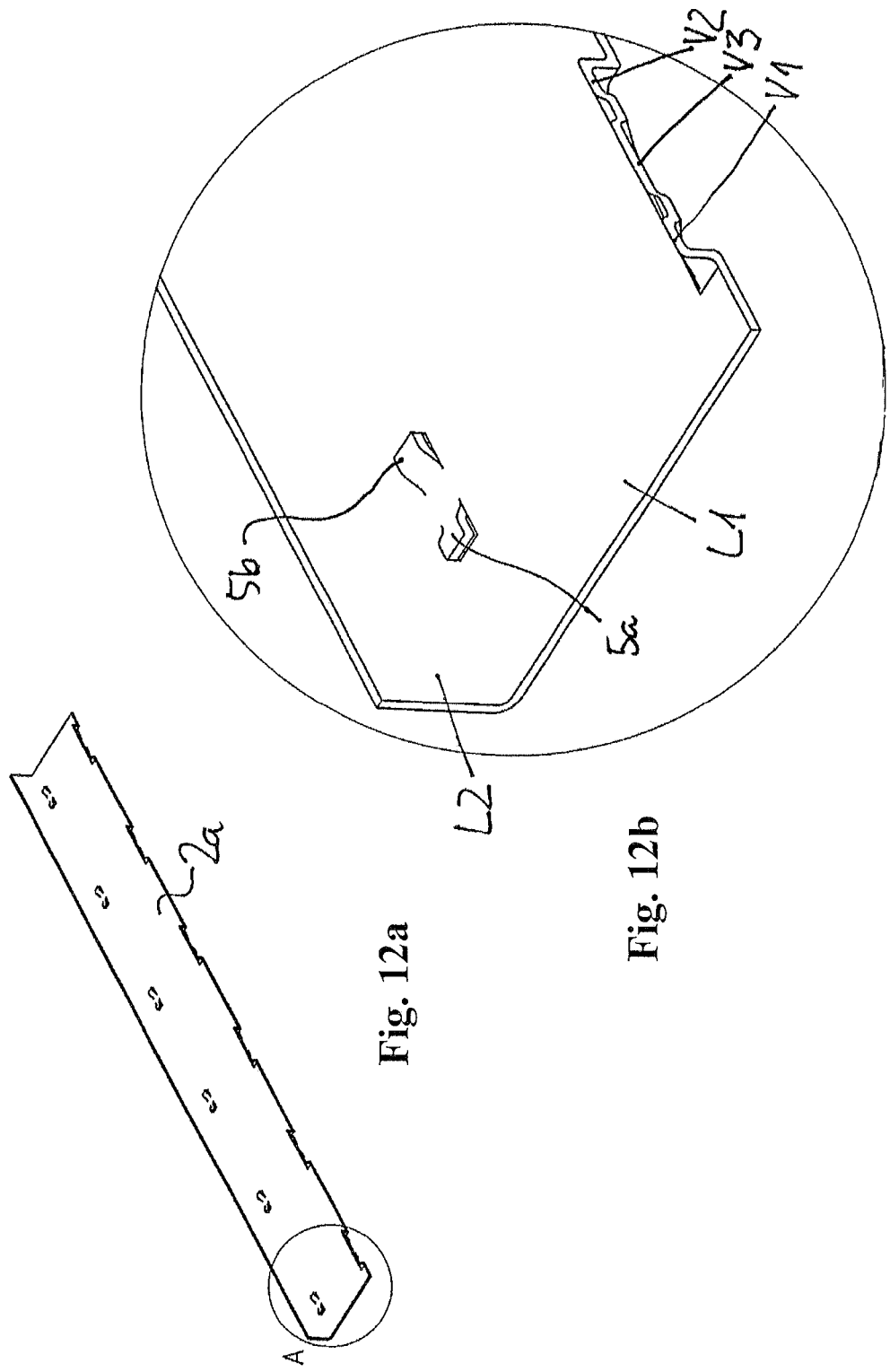
FIG. 12a and FIG. 12b show a perspective view and a detailed view, respectively, of one of the longitudinal sides of the grating of the further illustrative embodiment after the joining process.

FIG. 10 shows a U profile, open end down, at one end of an exemplary cross member (3c). As shown, the cross member (3c) has two punched recesses (4a, 4b) at one end, in each of which (4a, 4b) the first leg of a Z profile can be arranged and firmly connected to by way of a connection method.

FIGS. 11a and 11b show a further illustrative embodiment of a grating (1) according to the invention. Particularly in the case of long cross members, it is necessary, in addition to fixation against horizontal and vertical displacement, to define a third degree of freedom at the connection point. If the cross members show a fairly extensive linear expansion, such high torques are created—even under low expenditures of force—as to cause parallel displacement of the L profiles (L1, L2) of the longitudinal sides (2a, 2b) and consequently to transform the basic shape of the grating (1), which, ideally, is rectangular, into the shape of a parallelogram. To prevent this happening, provision is made for an additional support point in the contact area between the L profile (L1) and the cross member, this support point being able to statically absorb the torque originating in the plane of the connecting leg. A concrete manufacturing solution is achieved, as shown in FIGS. 11a, 11b, 12a and 12b, by punching the L profiles (L1) of the longitudinal sides (2a, 2b) at a location as far away as possible from the first support point, which is formed by the deformation(s) (V) directly beside the press-fit connection. In the subsequent process, two tongues (5a, 5b) are formed from the punched-in area, which, thanks to their being in direct contact with the inner side of the cross member, are able to take up the torque and increase the overall stability of the grating (1).

In order that the deformation(s) (V) beside the press-fit connection and also the punching step for formation of the tongues (5a, 5b) can be performed in a single joining process, the punched recess (4a, 4b) in the cross member is not oriented downwards relative to the post-assembly position of the grating (1) (as shown in FIGS. 5 and 6), but upwards. A downwardly operating stamping and punching tool can generate all the material deformations simultaneously, since now all the parts to be joined during the joining process can be turned by 180° relative to the post-assembly position of the grating (1). As a measure to improve the joint, a third deformation (V3) is introduced between the bars of the cross member in addition to the deformations (V1, V2) on either side thereof.

The general part of the description may be referred to in respect of further features not shown in the drawings.

To conclude, it is pointed out that the teaching of the invention is not limited to the illustrative embodiments described above. On the contrary, a wide range of configurations is possible for the longitudinal sides and the cross members, as too are different numbers of cross members, different profiles and different shapes.

The invention claimed is:

1. A grating comprising:
a first longitudinal side;
a second longitudinal side; and
first and second cross members arranged between the first and second longitudinal sides;
wherein the first longitudinal side has a first cross section in the shape of a first profile and the second longitudinal side has a second cross section in the shape of a second profile;
wherein each of the first and second profiles comprises at least a first leg and a second leg substantially orthogonal to said first leg;
wherein each of the first and second cross members has a first end and a second end opposite to the first end and a cross member cross section in the shape of a U or V profile, having an open throat oriented towards an underside of the grating;
wherein each of the first and second cross members has first and second punched recesses at the first and second ends, respectively;
wherein the first leg of the first profile is arranged in and firmly connected to the first punched recess and the first leg of the second profile is arranged in and firmly connected to the second punched recess by a connection method, wherein the first leg of the first profile and the first leg of the second profile is inserted or pressed into the first and second punched recesses, respectively, thereby achieving vertical fixation of the first and second profiles with the first and second cross members; and
wherein each of the first leg of the first profile and the first leg of the second profile has at least one deformation configured as an impression, thereby achieving horizontal fixation of a plug-in or press-fit connection of the first and second cross members with the first and second profiles.

2. A grating comprising:
a first longitudinal side;
a second longitudinal side; and
first and second cross members arranged between the first and second longitudinal sides;
wherein the first longitudinal side has a first cross section in the shape of a first profile and the second longitudinal side has a second cross section in the shape of a second profile;
wherein each of the first and second profiles comprises at least a first leg and a second leg substantially orthogonal to said first leg;
wherein each of the first and second cross members has a first end and a second end opposite to the first end and a cross member cross section in the shape of an L profile having first and second open faces, the first open face being oriented towards an underside of the grating;

wherein each of the first and second cross members has a first and second punched recesses at the first and second ends, respectively;

wherein the first leg of the first profile is arranged in and firmly connected to the first punched recess and the first leg of the second profile is arranged in and firmly connected to the second punched recess by a connection method, wherein the first leg of the first profile and the first leg of the second profile is inserted or pressed into the first and second punched recesses, respectively, thereby achieving vertical fixation of the first and second profiles with the first and second cross members; and wherein each of the first leg of the first profile and the first leg of the second profile has at least one deformation configured as an impression, thereby achieving horizontal fixation of a plug-in or press-fit connection of the first and second cross members with the first and second profiles.

3. The grating according to claim 1, wherein each of the first and second profiles is configured as a Z profile or as an L profile, the second leg of the Z profile being substantially parallel to the first leg, and the Z-profile further comprising a connecting part that connects the first and second legs, and the second leg of the L-profile being substantially orthogonal to the first leg.

4. The grating according to claim 1, wherein each of the first leg of the first profile and the first leg of the second profile has at least two deformations, the two located one on each side of, either near or directly beside, the plug-in or press-fit connection so that the plug-in or press-fit connection between the first cross member and the first and second profiles is fixed horizontally on both sides and that the plug-in or press-fit connection between the second cross member and the first and second profiles is fixed horizontally on both sides.

5. The grating according to claim 1, wherein each of the first leg of the first profile and the first leg of the second profile has at least one additional deformation, which is respectively created prior to connection with the first and second cross members and over which the respective first and second cross member is inserted or pushed in.

6. The grating according to claim 5, wherein the additional deformation is an impression.

7. The grating according to claim 1, wherein each of the first leg of the first profile and the first leg of the second profile has at least one tongue, which is oriented towards the first cross member and the second cross member, respectively, in the area bordering on the second leg of the first profile and the second leg of the second profile, respectively.

8. The grating according to claim 7, wherein at least two tongues are provided on each of the first legs of the first and second profiles, which are oriented towards the first cross member and the second cross member, respectively.

9. The grating according to claim 1, wherein each of the first and second cross members have a cross section in the shape of an open profile, the open side of which is oriented towards the underside of the grating.

10. The grating according to claim 1, wherein the grating comprises steel, pre-galvanized steel, stainless steel or aluminium.

11. The grating according to claim 1, wherein the ratio of the load-carrying capacity of the grating to the dead weight of the grating is in the range from 10 to 200.

12. The grating according to claim 1, wherein at least 70% of the surface area covered by the grating is configured as free projection area.

13. The grating according to claim 1, wherein at least one punched recess at each of the first and second ends of the first and second cross members has an entry contour with at least one chicane, thereby enabling centered insertion and force- or form-fitting connection of the first leg of the first profile and the first leg of the second profile with the first and second cross members.

14. The grating according to claim 13, wherein the at least one punched recess is configured in the form of a wedge.

* * * * *

UNITED STATES PATENT AND TRADEMARK OFFICE
CERTIFICATE OF CORRECTION

PATENT NO. : 10,238,211 B2
APPLICATION NO. : 15/578824
DATED : March 26, 2019
INVENTOR(S) : Meiser Page 1 of 1

It is certified that error appears in the above-identified patent and that said Letters Patent is hereby corrected as shown below:

In the Claims

Column 11, Line 3, (Claim 2) after "has" delete: "a".

Column 11, Line 31, (Claim 4) after "deformations" delete: ", the two".

Signed and Sealed this
Thirtieth Day of April, 2019

Andrei Iancu
*Director of the United States Patent and Trademark Office*